June 15, 1937.  J. M. WALLING  2,083,968
NUT CRACKING MACHINE
Filed Feb. 25, 1935  3 Sheets-Sheet 2

INVENTOR
Joseph M. Walling.
BY
ATTORNEY

June 15, 1937.  J. M. WALLING  2,083,968
NUT CRACKING MACHINE
Filed Feb. 25, 1935   3 Sheets-Sheet 3
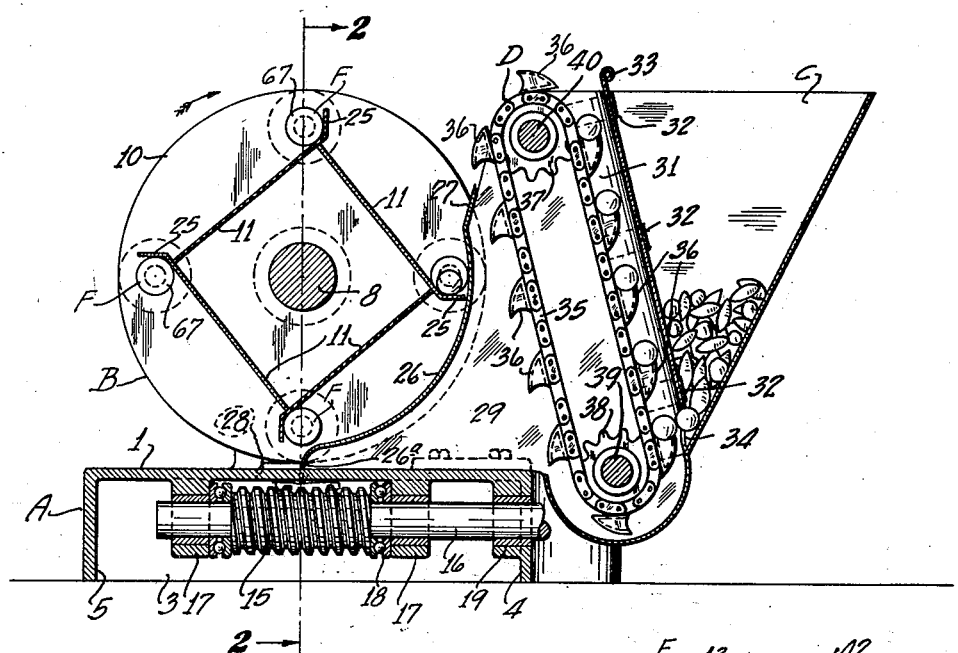
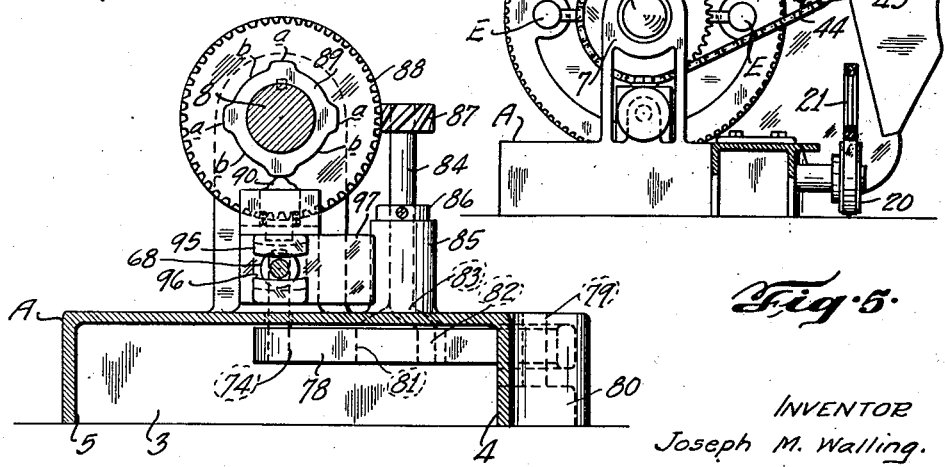
INVENTOR
Joseph M. Walling.
By
ATTORNEY Patented June 15, 1937

2,083,968

UNITED STATES PATENT OFFICE 2,083,968

NUT-CRACKING MACHINE

Joseph M. Walling, St. Louis, Mo.

Application February 25, 1935, Serial No. 7,955

9 Claims. (Cl. 146—12)

This invention relates generally to nut-cracking machines and has for its prime object the provision of a machine of the kind described for effecting fracture of the shell of the nut while avoiding mashing or crushing of the meat of the nut.

My invention has for another object the provision of a nut-cracking machine whose nut-engaging members are automatically spaced one from the other responsively to the dimensions of the respective individual nuts to be cracked.

My invention has for a further object the provision of a machine of the type and for the purposes stated which may be economically constructed, which is sturdy and durable, which may be inexpensively operated, and which is efficient in the performance of its intended functions.

And with the above and other objects in view, my invention resides in the novel features of form, construction, arrangement, and combination of parts presently described and pointed out in the claims.

In the accompanying drawings (three sheets),—

Figure 3 is a vertical sectional view of the machine taken approximately along the line 3—3, Figure 2;

Figure 4 is a similar view of the machine taken approximately along the line 4—4, Figure 2; and Figure 5 is a fragmentary end view, partly in section, of the drive-end of the machine, the motor being removed and omitted.

Figure 1:
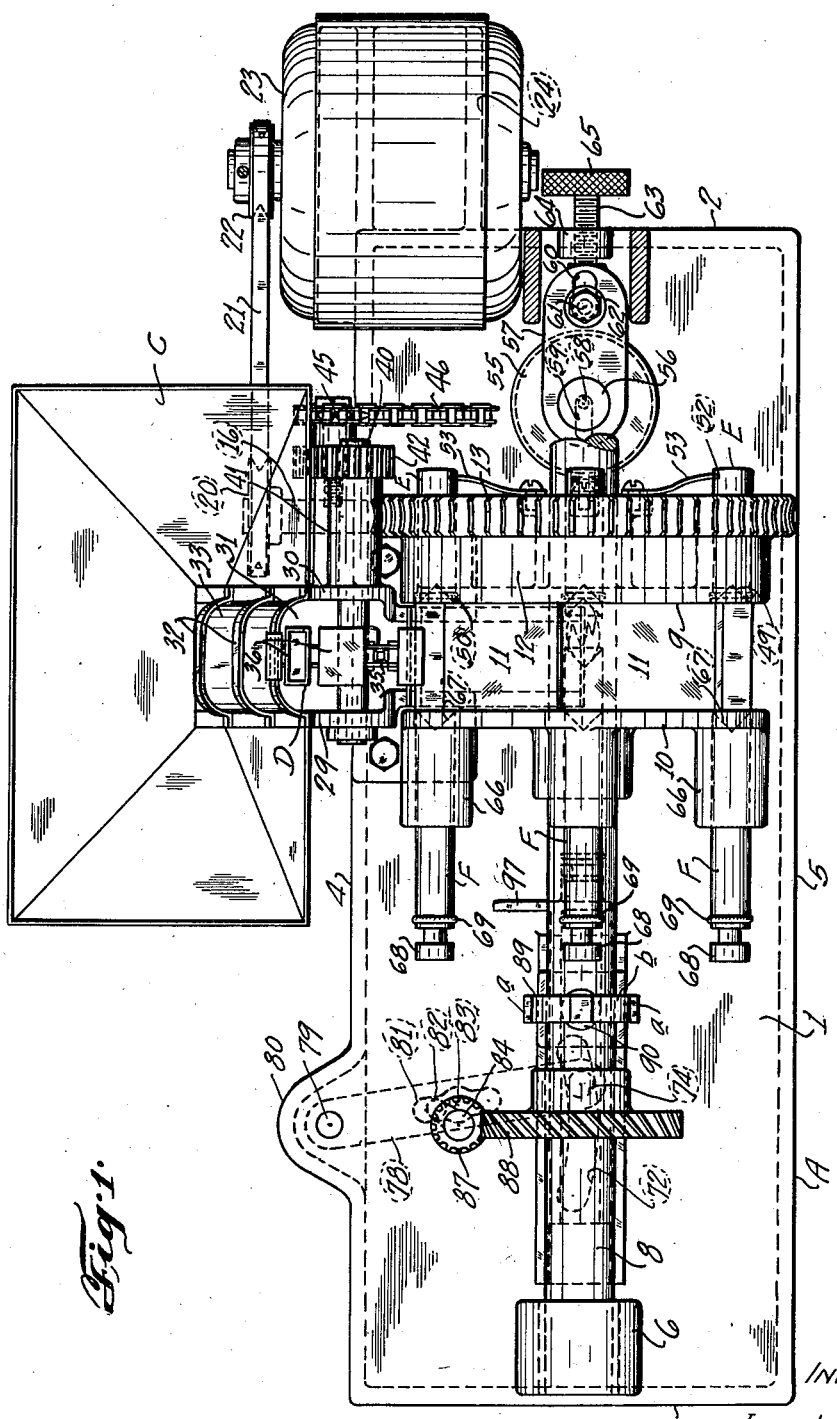
Figure 1 is a top plan view of a nut-cracking machine embodying my invention.

Referring now more in detail and by reference characters to the drawings, which illustrate a preferred embodiment of my invention, the main frame of the machine comprises a substantially rectangular base A which includes a horizontal bed-plate 1 supported on vertical end-walls 2, 3, and side-walls 4, 5, respectively; and upstanding from the plate 1 adjacent its opposite ends, are bearing-standards 6, 7, supporting for rotation the main-shaft 8 of the machine.

Intermediate its ends, the shaft 8 has fixed thereto a nut-carrier B, which comprises a pair of spaced discs or end-plates 9, 10, connected unitarily by a series of transverse partition plates 11, presently more particularly described.

One of the end-plates, as 9, of the carrier B, is equipped with a circumferential flange 12, on which is preferably integrally formed a worm-gear 13, which peripherally projects through a suitable aperture 14 in the bed-plate 1 for meshing engagement with a worm 15 mounted on a shaft 16 disposed transversely of the base A and journaled in suitable bearings 17 depending from the bed-plate 1, suitable thrust-bearings 18 being provided in the manner usual in such constructions.

At one end, the shaft 16 is mounted in and through a suitable bearing 19 provided in the side-wall 4 of the base A, beyond which the shaft 16 is extended for receiving a pulley 20, which latter, in turn, for effecting rotatory actuation of the carrier B, is connected by a belt 21 with a driving-pulley 22 on the shaft of a suitable prime-mover preferably in the form of an electric motor 23 supported on brackets 24 projecting from the end-wall 2 of the base A.

Figure 2:
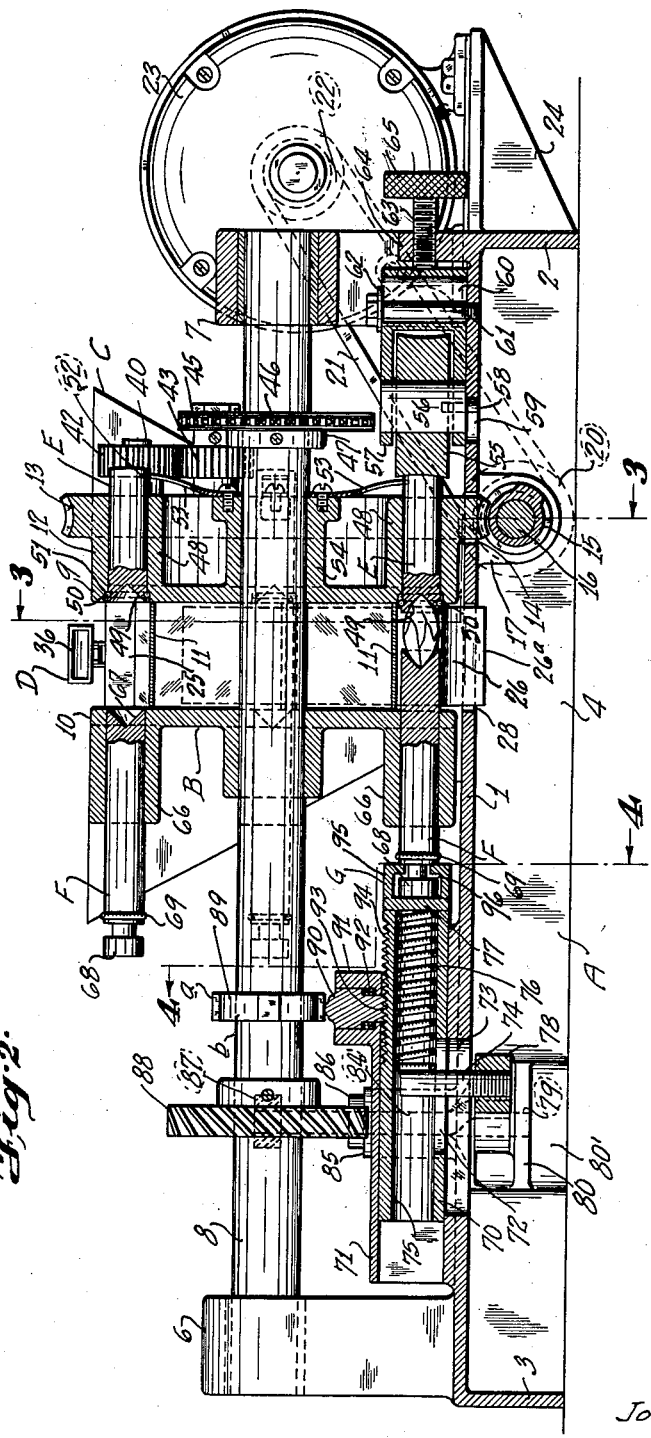
Figure 2 is a longitudinally sectional view of the machine.

The partitions 11 are arranged in the form of a rectangular or square drum between the end-plates 9, 10, each corner of the drum having a projecting wing 25 forming a nut-supporting pocket. During a portion of a revolution of the carrier B, the respective pocket-forming wings 25 pass closely adjacent to a curved boot-plate 26, whose upper end is bent slightly outwardly for providing a feed-plate 27, and whose lower end 26a terminates at and projects into an aperture 28 provided in the bed-plate 1, as best seen in Figures 2 and 3.

The boot-plate 26 is mounted on a pair of suitably spaced side-frames or hopper brackets 29, 30, in turn, suitably mounted on the base A, and projecting laterally from a side thereof for supporting a nut-hopper C of conventional construction. The wall of the hopper C that is adjacent the carrier B is slotted, as at 31, and projecting upwardly through the slot 31, is a series of bridge-members or gate-guides 32, in which is frictionally fitted a gate 33 manually shiftable toward and from the apex or bottom of the hopper C for providing an adjustable feed-opening 34 for regulating the egress of nuts from the hopper.

Between the hopper C and carrier B, is disposed an inclined nut-elevator or feeder D comprising a continuous or endless sprocket chain 35 equipped with a series of spaced brackets 36 and trained over upper and lower sprockets 37, 38, respectively, the lower sprocket 38 being mounted on an idler or tail-shaft 39 journaled in and between the side-frames 29 and 30, and the upper sprocket 37 being fixed on a driving or head-shaft 40 likewise journaled in and between the side-frames 29 and 30, all as best seen in Figure 1.

At one end, the head-shaft 40 projects through a suitable hub or bearing 41 on the side-frame 30 and carries a gear 42, which meshes with a subjacent gear 43 journaled on a stub-shaft 44 also projecting from the frame 30. Mounted on the hub of the gear 43, is a sprocket-pinion 45 engaged by a sprocket-chain 46, which, in turn, is trained over a sprocket-gear 47 mounted on the main shaft 8 of the machine, for operation or actuation of the elevator D in synchronism with revolution of the carrier B.

The carrier B supports, as by means of suitable bored bosses or hubs 48, 66, formed on and oppositely projecting outwardly and laterally from the end-plates 9, 10, respectively, as best seen in Figures 1 and 2, a plurality, in the present instance four in number, of pairs of axially aligned opposing nut-cracking jaws, each pair of jaws comprising a hammer-jaw E and an anvil-jaw F, endwise movable toward and from each other in parallelism with the main-shaft 8, a pair of jaws E, F, being disposed at each corner of the square formed by the partition plates 11, for engaging a nut reposing on the adjacent nut-supporting wing 25.

Each hammer-jaw E comprises a plunger slidable in a boss or hub 48 and at its inner end is provided with a preferably conical recess 49 for receiving one end of the nut to be cracked, as will presently appear.

Also at its inner end, each jaw E is provided with a suitable annular groove in which is fitted a removable retainer ring 50 engageable with a recessed abutment-seat 51. At its outer end, each plunger E is provided with a notch 52 in which is engaged the free end of a leaf-spring 53 fixed at its other end on the hub 54 of the end-plate 9 for yieldingly biasing the jaw E outwardly, with normally the retainer 50 engaged upon the seat 51 and the inner end of the jaw E flush with the inside face of the end-plate 9.

On revolution of the carrier B, however, each respective jaw E, as it passes the lower center of the carrier B, is endwise engaged by a roller or, as may be said, a cam 55 mounted on a shaft 56 fixed between the legs of a bifurcated yoke 57 adjustably slidable on the bed-plate 1, the shaft 56 carrying a depending pin 58 guidingly shiftable in a suitably elongated slot 59 provided in the bed-plate 1. For adjustability, the head or bight of the yoke 57 is likewise provided with an also suitably elongated slot 60, through which extends a stud-bolt or guide-pin 61, a washer 62 being engaged between the head of the bolt 61 and the yoke 57 for retaining the latter in position on the bed-plate 1.

A screw 63, threaded through a lug 64 upstanding from the bed-plate 1, engages its inner end with the yoke 57, and at its outer end is provided with a knurled head 65 for manual manipulation for adjusting the position of the roller 55 with respect to the path of the respective jaws E, which latter, as they, respectively, engage the roller 55 on revolving or rotatory movement of the carrier B, are caused to temporarily shift inwardly through the end-plate 9 a suitable distance for nut-cracking purposes, as will presently appear.

Each anvil-jaw F comprises a plunger slidably mounted in a boss or hub 66, and at its inner end provided with a preferably conical recess 67 for receiving the other end of the nut to be cracked, as presently appearing.

At its outer portion, each jaw F is necked or reduced in section and thereby formed at its extreme end with a button-head 68. Inwardly of such reduced portion, each jaw F is provided with a suitable annular groove in which is removably fitted a retainer ring 69 engageable with the outer end of the guide or boss 66 for limiting the inward movement of the jaw F, each jaw F in its normal position, however, being extended outwardly of the carrier B with its inner end flush with the inside face of the end-plate 10.

On revolution of the carrier B, each respective jaw F, as it passes the lower center of the carrier B, is engaged by a shiftable anvil-abutment G automatically operable responsive to longitudinal dimension of a nut disposed in the carrier B between the anvil F and hammer E for first biasing or shifting the anvil F on the nut and then locking the anvil F in nut-abutting or engaging position during the nut-cracking operation of the machine.

The abutment G includes a hollow or tubular plunger 70 slidably mounted in a suitably elongated guide 71 upstanding from the base-plate 1 with its axis in parallelism with the main-shaft 8 of the machine. In the lower portion of its wall, the plunger 70 is provided with a longitudinal arcuate slot 72, substantially in registration with a like, though longer, slot 73 provided in the bed-plate 1.

Reciprocable in the slots 72, 73, is a pin 74, which projects upwardly into the bore 75 of the plunger 70, a suitable compressible member in the form of a coiled spring 76 being mounted in the bore 75 between the pin 74 and the front wall 77 of the plunger 70 for normally biasing the plunger 70 with the rear wall of the slot 72 engaging the pin 74.

The pin 74 is mounted on the one or free end of a lever 78 disposed beneath the bed-plate 1 with its other end pivoted on a pin 79 suitably mounted in a plate 80 provided in a pocket 80' formed on a side-wall 4 of the base A.

Intermediate its ends, the lever 78 is provided with a cam-slot 81, in which is workably disposed a pin 82 depending from a crank or arm 83 formed on the lower end of a vertically disposed shaft 84 journaled in and through a bearing 85 upstanding from the bed-plate 1 of the machine, the shaft 84 being equipped with a set-collar 86 which bears on the upper end of the bearing 85 for supporting the shaft therein.

At its upper end, the shaft 84 carries a helical pinion 87, which meshes with a helical gear 88 mounted on the main shaft 8 of the machine, the pinion 87 and gear 88 meshing, in the present instance, at a four-to-one ratio, whereby the lever 78 is caused to vibrate once every quarter revolution of the shaft 8 for correspondingly, through the compressing engagement of spring 76 by the shiftable pin 74, reciprocating the abutment G in the guide 71 toward and from the carrier B.

Mounted on the shaft 8 is an edge-cam 89 provided with a plurality, in the present instance also four in number, of peripheral equally spaced raised portions $a$ separated by respective depressed portions $b$. Disposed beneath, and actuatively co-operable with, the cam 89, is a detent member or cam-follower 90 vertically shiftable in a guide-socket 91 and upwardly biased upon the cam 89 by means of a suitably mounted spring 92, as best seen in Figure 2.

At its lower end, the follower 90 extends through a suitable aperture in the guide 71 and is provided with a series of detents or teeth 93, the follower 90 being normally, that is to say, when the follower is engaged with a depressed cam-portion $b$, in upwardly shifted position in the socket 91 with its teeth 93 substantially clearing the inner wall of the guide 71.

On engagement of a raised cam-portion $a$ with the follower 90, however, the latter is depressed in the socket 91, which projects the teeth 93 into the guide 71 for engaging or meshing with a rack or tooth-series 94 provided on or in the upper side of the plunger 70, for locking the same rigidly against movement at whatever position the plunger 70 may be in at that moment.

At its end adjacent the carrier B, the abutment G is equipped with a coupling head 95 provided with a transverse arcuate T-slot 96 for receiving the respective button heads 68 of the jaws F, the plane of the center-line of the slot 96 being coincident with the path of travel of the jaws F and the axis of the abutment G lying in the prolongation of the axis of each respective jaw F when the same is at its lower center of revolution, that is to say, at the nut-cracking position of the jaw.

A lug or shoe 97, which forms a prolongation of the rear wall of the T-slot 96, is laterally extended from the head 95 toward the direction of approach of the jaws F, for, during the operation of the machine as presently appearing, initially engaging the respective button-heads 68 and guiding the same into the slot 96.

In use and operation of the machine, the nuts to be cracked are deposited in the hopper C, and the gate 33 is adjusted for providing a proper dimension of feed-opening 34, so that the nuts will be discharged to the elevator D.

The mechanism is then started, and the relative motion of the elevator D is such that the nuts will be discharged from the elevator D successively one at a time into the respective pockets 25 of the carrier B, each nut in a particular pocket 25 being disposed substantially in axial alignment with, and between, the pair of jaws E, F, associated with the particular pocket 25, and sliding downwardly along the boot-wall 26 as the carrier B rotates.

The reciprocation of the abutment G toward and from the carrier B is effected in such synchronism with the motion of the carrier B that, as a particular jaw F approaches its nut-cracking position, and while still some distance therefrom, the abutment G is advanced toward the carrier B and initially engages the shoe 97 with the button-head 68 of the anvil-jaw F for shifting the jaw inwardly into the pocket 25 toward the hammer-jaw E.

As the jaw F advances toward the jaw E, the opposite ends of the nut therebetween are engaged with and in the conical recesses 49, 67, of the jaws E, F, respectively, thus aligning the nut with the jaws and firmly gripping the nut therebetween.

Obviously, the nuts, even when of the same kind, vary in dimensions, and especially in length. Also, when cracking the nut, the pressure to be exerted is that which will be sufficient for merely cracking the shell for avoiding mashing of the meat of the nut.

The travel of the pin 74 on the lever 73 is sufficient for advancing the jaw F substantially to the jaw E, but when a nut is engaged between the jaws E, F, the resiliency of the spring 76, which is interposed between the pin 74 and the abutment G, permits the nut to arrest the motion of the jaw F on initial engagement of the nut between the jaws at precisely that distance from the jaw E which is a measure of the length of the nut, that is to say, the abutment G has a stroke that is variable responsively to nut dimension. The bias of the spring 76 is sufficient to firmly hold the nut between the jaws E, F, though insufficient to rupture the shell of the nut.

While the jaw F is thus being automatically spaced from the jaw E responsively to dimension of the nut disposed therebetween, on the continued revolving motion of the carrier B, the button-head 68 of the respective jaw F enters the T-slot 96 of the abutment G, and at approximately the same time a raised portion $a$ of the cam 89 will engage the follower 90 for depressing the same in its socket 91 until the teeth 93 engage the rack 94 for temporarily rigidly locking the abutment G in its nut-arrested position.

Substantially at this moment, the hammer-jaw E is co-actively engaged by the roller 55, which effects a movement of the jaw E toward the now securely held anvil-jaw F a small distance sufficient merely to crack the shell of the nut, such distance having been initially determined by the operator, who, for such purpose, shifts the roller 55 toward or from the carrier B by suitable manipulation of the adjusting-screw 63.

The nut-cracking operation is completed as the jaws E, F, pass the lower center of their revolution, that is to say, as they pass the axis of the abutment G. Subsequently, the follower 90 rises into a recess $b$ of the cam 89 for releasing the follower 90 from the rack 94, and the pin 74, meanwhile moving rearwardly responsively to vibratory motion of the lever 73, engages the rear wall of the plunger-slot 72 for retracting the abutment G in the guide 71.

The respective button-head 68 being yet engaged in the T-slot 96, the jaw F is, by such retracting motion of the abutment G, withdrawn from the carrier to the initial position of the jaw, that is, with the inner end of the jaw F flush with the inner face of the end-plate 10 of the carrier B, the particular button-head 68 leaving the abutment G and the particular jaw E returning under the pull of spring 53 to its normal position as the jaw E passes the roller or cam 55 on a revolution of the carrier B.

All the foregoing operations are completed as the particular head 68 is released from the T-slot 96 and the mechanism is now in position for repetition of the nut-cracking cycle, the cracked nut meanwhile dropping through the aperture 28 into a suitable receptacle (not shown).

It will be understood that changes and modifications in the form, construction, arrangement, and combination of the several parts of my nut-cracking machine may be made and substituted for those herein shown and described without departing from the nature and principles of my invention.

Having thus described my invention, what I claim and desire to secure by Letters Patent is,—

1. In a nut-cracking machine, a hammer, an anvil shiftable for co-operating with the hammer, a slotted tubular reciprocatory plunger normally spaced from the anvil, a pin disposed for movement in the slot of the plunger, a spring disposed for compression within the plunger intermediate an end wall thereof and the pin means rigidly formed on the plunger for selectively engaging the anvil, and means for shifting the pin for actuating the plunger through the spring for endwise engagement with the anvil for shifting the same, in turn, into nut-cracking position relatively to the hammer.

2. In a nut-cracking machine, a hammer, an anvil shiftable for co-operating with the hammer, a slotted tubular reciprocatory plunger normally spaced from the anvil, a pin disposed for movement in the slot of the plunger, a spring disposed for compression within the plunger intermediate an end wall thereof and the pin means mounted on the plunger for engaging the anvil, means for shifting the pin for actuating the plunger through the spring for endwise engagement with the anvil for shifting the same, in turn, into nut-cracking position relatively to the hammer, and means for releasably locking the plunger in shifted position for retaining the anvil in nut-cracking position.

3. In a nut-cracking machine, a shiftable hammer, an anvil shiftable for co-operating with the hammer, a slotted tubular reciprocatory plunger normally spaced from the anvil, a pin disposed for movement in the slot of the plunger, a spring disposed for compression within the plunger intermediate an end wall thereof and the pin means mounted rigidly on the plunger for engaging the anvil, means for shifting the pin for actuating the plunger through the spring for endwise engagement with the anvil for shifting the same, in turn, into nut-cracking position relatively to the hammer, means including a cam-actuated slidably shiftable detent for releasable engagement with the plunger for retaining the anvil in nut-cracking position, and means for shifting the hammer for co-operation with the anvil in a nut-cracking operation.

4. In a nut-cracking machine, in combination, a rotary nut-carrier, first and second normally spaced nut-engaging jaws supported for shiftable movement on the carrier, means for feeding a nut to the carrier for positioning the same between said jaws, a slotted tubular reciprocatory plunger, means mounted rigidly on the plunger for engaging the first jaw for shifting the same toward the second jaw for gripping the positioned nut therebetween, means including a vibratory pin movable in the slot of the plunger and a compressible member within the plunger engageable by the pin for actuating the plunger for permitting the nut to arrest the motion of the first jaw on engagement of the nut between the jaws, means including a shiftable detent member for engaging the plunger for retaining the first jaw in nut-engaging position, means including a member engageable by the second jaw during movement of the carrier for shifting the second jaw toward the first jaw for cracking the nut, and means for actuating the carrier, the pin, and the detent in unison.

5. In a nut-cracking machine, a hammer, a shiftable anvil, and means for shifting the anvil for spacing the same from the hammer responsive to nut-dimension, said means including a slotted tubular reciprocatory plunger, means on the plunger for engaging the anvil, a pin disposed for movement in the slot of the plunger, and means for reciprocatorily actuating said pin in timed relation with movement of the anvil, a spring disposed for compression within the plunger intermediate an end-wall thereof and the pin.

6. In a nut-cracking machine, a nut-carrier, a hammer disposed for movement on the carrier, an anvil disposed for movement on the carrier in co-operation with the hammer, means for feeding a nut to the carrier for disposition intermediate the hammer and anvil, means for shifting the anvil yieldingly into engagement with the nut for a nut-cracking operation, said means including a reciprocatory tubular plunger normally spaced from the anvil and a spring disposed for compression within the plunger, the plunger and anvil being constructed for co-operative engagement for retraction of the anvil following a nut-cracking operation, a cam actuated locking jaw engageable with the anvil for preventing shifting of the anvil during one phase of movement thereof, and means for shifting the hammer toward the anvil while the anvil is so engaged.

7. In a nut-cracking machine, a nut-carrier, a hammer disposed for movement on the carrier, an anvil disposed for movement on the carrier in co-operation with the hammer, means for feeding a nut to the carrier for disposition intermediate the hammer and anvil, means for shifting the anvil yieldingly into engagement with the nut for a nut-cracking operation, said means including a reciprocatory tubular plunger normally spaced from the anvil and a spring disposed for compression within the plunger, the first jaw having a head and the plunger having a T-slot for receiving the head for enabling retraction of the first jaw by the plunger following a nut-cracking operation, a cam actuated locking jaw engageable with the anvil for preventing shifting of the anvil during one phase of movement thereof, and means for shifting the hammer toward the anvil while the anvil is so engaged.

8. In a nut-cracking machine, a hammer, a shiftable anvil, and means for shifting the anvil for spacing the same from the hammer responsive to nut-dimension, said means including a slotted tubular reciprocatory plunger, means on the plunger for engaging the anvil, a pin disposed for movement in the slot of the plunger, means for reciprocatorily actuating said pin in timed relation with movement of the anvil, a spring disposed for compression within the plunger intermediate an end-wall thereof and the pin, a flat-face toothed member disposed longitudinally along the plunger, and a reciprocatorily actuated member engageable with the flat member for preventing longitudinal movement of the plunger at timed intervals.

9. In a nut-cracking machine, in combination, a rotary nut-carrier, first and second normally spaced nut-engaging jaws supported for shiftable movement on and also being movable rotarily with the carrier, means for feeding a nut to the carrier for positioning the same between said jaws, a reciprocatory plunger normally spaced from the nut-carrier and positioned for periodical engagement with the first nut-engaging jaw, a spring disposed within said plunger in abutting engagement at one end thereof with an end wall of the plunger, and a reciprocatorily actuated pin in operative engagement with the other end of said spring for longitudinally shifting the plunger when the first nut-engaging jaw is engaged therewith.

JOSEPH M. WALLING.